United States Patent
Wang et al.

(10) Patent No.: US 9,716,701 B1
(45) Date of Patent: Jul. 25, 2017

(54) SOFTWARE AS A SERVICE SCANNING SYSTEM AND METHOD FOR SCANNING WEB TRAFFIC

(71) Applicant: Trend Micro Incorporated, Tokyo (JP)

(72) Inventors: Lei Wang, Nanjing (CN); Bin Shi, Nanjing (CN); Dan Tan, Nanjing (CN); Liulin Yang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/666,914

(22) Filed: Mar. 24, 2015

(51) Int. Cl.
*H04L 29/06* (2006.01)
*H04L 9/32* (2006.01)
*H04L 29/08* (2006.01)
*H04W 12/08* (2009.01)

(52) U.S. Cl.
CPC .............. *H04L 63/08* (2013.01); *H04L 63/14* (2013.01); *H04L 63/1408* (2013.01); *H04L 63/1416* (2013.01); *H04L 63/1425* (2013.01); *H04L 63/1458* (2013.01); *H04L 63/1483* (2013.01); *H04L 67/02* (2013.01)

(58) Field of Classification Search
CPC ..... H04L 63/08; H04L 63/14; H04L 63/1408; H04L 63/1416; H04L 63/1425; H04L 63/1441; H04L 63/145; H04L 63/1458; H04L 63/1466; H04L 63/1483; H04L 63/166; H04L 63/168; H04L 63/20; H04L 63/30; H04L 63/306; H04L 67/02
See application file for complete search history.

(56) References Cited

U.S. PATENT DOCUMENTS

| | | | |
|---|---|---|---|
| 7,891,001 B1 * | 2/2011 | Greenawalt | H04L 63/20 713/151 |
| 8,127,358 B1 * | 2/2012 | Lee | G06F 21/564 726/22 |
| 8,892,766 B1 * | 11/2014 | Wei | H04L 63/1408 706/22 |
| 8,914,406 B1 * | 12/2014 | Haugsnes | H04L 63/1441 382/305 |

(Continued)

OTHER PUBLICATIONS

Xu, Le, et al. "Secure web referral services for mobile cloud computing." Service Oriented System Engineering (SOSE), 2013 IEEE 7th International Symposium on. IEEE, 2013.*

(Continued)

*Primary Examiner* — Michael Simitoski
(74) *Attorney, Agent, or Firm* — Okamoto & Benedicto LLP

(57) ABSTRACT

An endpoint computer includes a local client that transmits web traffic to a local proxy that also runs on the endpoint computer. The local proxy obtains a customer identity string that identifies a user of the local client as a paying customer of an SaaS scanning service provided by an SaaS scanning system. The local proxy inserts the customer identity string into the web traffic and thereafter transmits the web traffic to the SaaS scanning system, which authenticates the customer identity string before scanning the web traffic for web threats. The local client transmits the web traffic to the local proxy using a communication protocol and the local proxy can transmit the web traffic to the SaaS scanning system using the same or different communication protocol.

15 Claims, 3 Drawing Sheets

(56) References Cited

U.S. PATENT DOCUMENTS

| | | | |
|---|---|---|---|
| 9,154,484 B2* | 10/2015 | Wing | H04L 63/08 |
| 2004/0068569 A1* | 4/2004 | Liao | H04L 67/303 |
| | | | 709/228 |
| 2004/0125149 A1* | 7/2004 | Lapidous | G06F 3/0481 |
| | | | 715/808 |
| 2006/0174345 A1* | 8/2006 | Flanagan | G06F 21/554 |
| | | | 726/24 |
| 2007/0074018 A1* | 3/2007 | Edwards | H04L 63/0281 |
| | | | 713/150 |
| 2009/0193129 A1* | 7/2009 | Agarwal | H04L 63/0281 |
| | | | 709/229 |
| 2009/0323953 A1* | 12/2009 | Narayan | G06Q 40/00 |
| | | | 380/258 |
| 2010/0082979 A1* | 4/2010 | Edwards | H04L 63/0428 |
| | | | 713/168 |
| 2010/0192212 A1* | 7/2010 | Raleigh | G06Q 10/06375 |
| | | | 726/7 |
| 2010/0217850 A1* | 8/2010 | Ferris | H04L 63/20 |
| | | | 709/223 |
| 2011/0047620 A1* | 2/2011 | Mahaffey | G06F 21/564 |
| | | | 726/23 |
| 2011/0167474 A1* | 7/2011 | Sinha | G06F 21/56 |
| | | | 726/1 |
| 2012/0147420 A1* | 6/2012 | Nishimi | G06F 3/1204 |
| | | | 358/1.15 |
| 2012/0179802 A1* | 7/2012 | Narasimhan | H04L 41/046 |
| | | | 709/223 |
| 2012/0240183 A1* | 9/2012 | Sinha | H04W 12/08 |
| | | | 726/1 |
| 2012/0324581 A1* | 12/2012 | Economos, Jr. | H04W 12/08 |
| | | | 726/25 |
| 2014/0237539 A1* | 8/2014 | Wing | H04L 63/08 |
| | | | 726/1 |
| 2015/0128205 A1* | 5/2015 | Mahaffey | H04L 63/20 |
| | | | 726/1 |
| 2015/0334029 A1* | 11/2015 | Patil | H04L 47/2441 |
| | | | 370/235 |
| 2015/0341383 A1* | 11/2015 | Reddy | H04L 63/0245 |
| | | | 726/22 |
| 2016/0006755 A1* | 1/2016 | Donnelly | H04L 63/0263 |
| | | | 726/1 |

OTHER PUBLICATIONS

Yassin, Warusia, et al. "A cloud-based intrusion detection service framework." Cyber Security, Cyber Warfare and Digital Forensic (CyberSec), 2012 International Conference on. IEEE, 2012.*

* cited by examiner

SOFTWARE AS A SERVICE SCANNING SYSTEM AND METHOD FOR SCANNING WEB TRAFFIC

BACKGROUND OF THE INVENTION

1. Field of the Invention

The present invention relates generally to computer security.

2. Description of the Background Art

Software as a service (SaaS) is a software distribution model in which software is hosted by a service provider and made available to customers over a computer network, such as the Internet. Data communication between a client and a server over the Internet is also referred to as "web traffic." Web traffic may be scanned for web threats, such as computer virus, denial of service attack, phishing campaign, violation of security policy, and other malicious activity or content. The scanning of web traffic for web threats may be performed by on-premise computer systems or by an SaaS scanning service. The web traffic may be between an on-premise endpoint computer and an SaaS application software, such as a MICROSOFT OFFICE application software hosted in-the-cloud.

SUMMARY

In one embodiment, an endpoint computer includes a local client that transmits web traffic to a local proxy that also runs on the endpoint computer. The local proxy obtains a customer identity string that identifies a user of the local client as a paying customer of an SaaS scanning service provided by an SaaS scanning system. The local proxy inserts the customer identity string into the web traffic and thereafter transmits the web traffic to the SaaS scanning system, which authenticates the customer identity string before scanning the web traffic for web threats. The local client transmits the web traffic to the local proxy using a communication protocol and the local proxy can transmit the web traffic to the SaaS scanning system using the same or different communication protocol.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
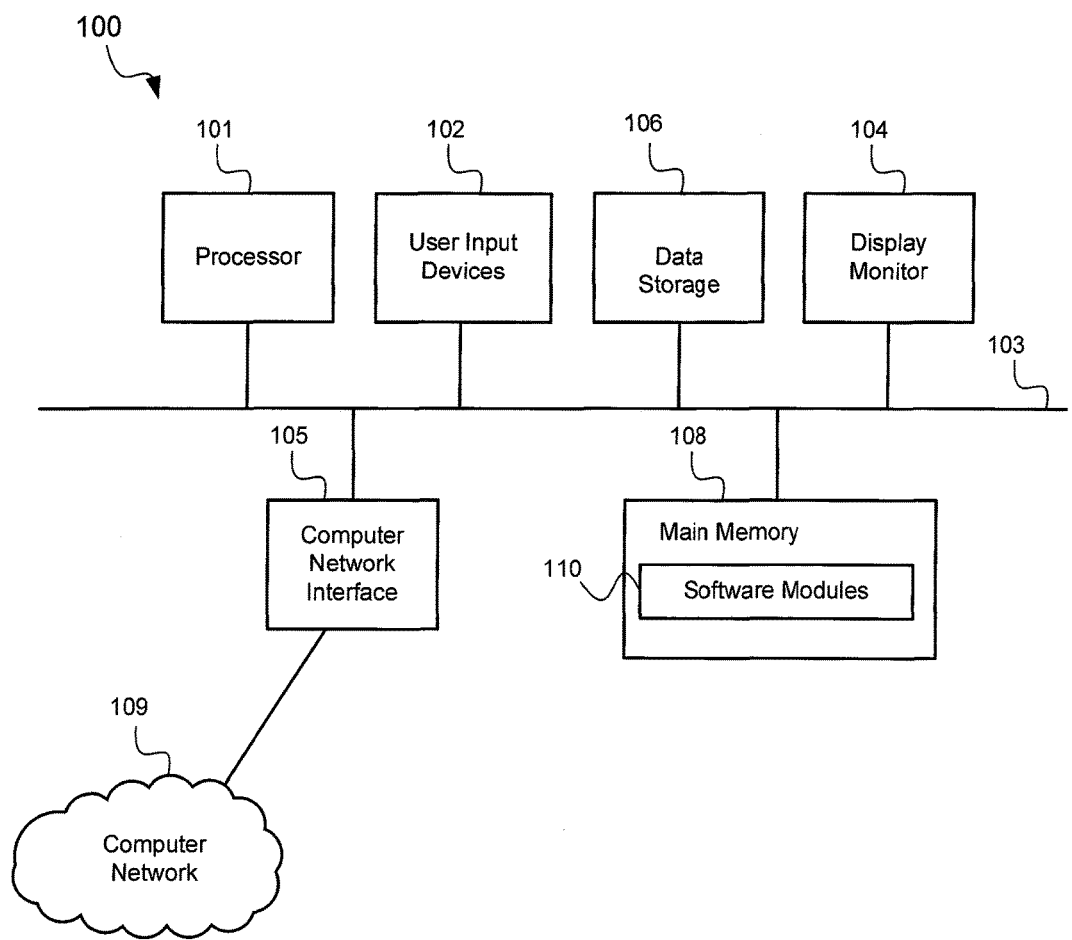
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as an endpoint computer, as part of a computer system, and other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a local proxy application when the computer 100 is employed as an endpoint computer. As another example, the software modules 110 may comprise a proxy server and a scanner when the computer 100 is employed as part of an SaaS proxy server system.

The computer 100 may be configured to perform its functions by executing the software modules 110. The software modules 110 may be loaded from the data storage device 106 to the main memory 108. An article of manufacture may be embodied as a non-transitory computer-readable medium including instructions that when executed by the computer 100 causes the computer 100 to be operable to perform the functions of the software modules 110.

Figure 2:
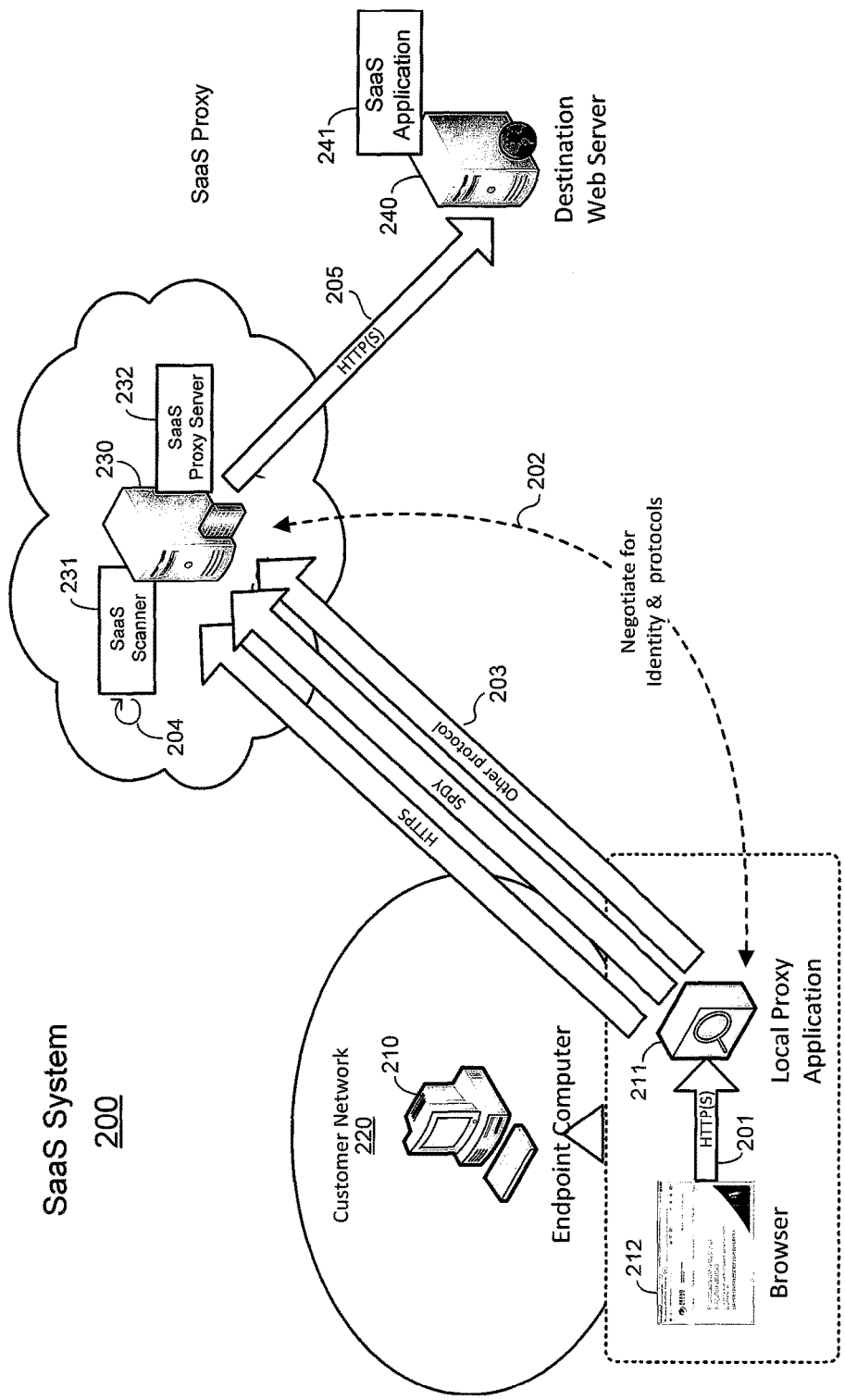
FIG. 2 shows a schematic diagram of an SaaS system in accordance with an embodiment of the present invention.

FIG. 2 shows a schematic diagram of an SaaS system 200 in accordance with an embodiment of the present invention. In the example of FIG. 2, the SaaS system 200 comprises one or more endpoint computers 210, an SaaS scanning system 230, and a destination web server system 240. The components of the SaaS system 200 may communicate over the Internet or other computer network.

In the example of FIG. 2, an endpoint computer 210 comprises a computer that is on-premise within a private computer network 220 of a customer (e.g., a corporation, individual, government, small business) of an SaaS scanning service provided by the SaaS scanning system 230. The endpoint computer 210 may also be employed outside of the private computer network 220 by taking advantage of additional security features provided by a local proxy application 211. The SaaS scanning service is typically provided to a plurality of endpoint computers 210 of different customers but only one endpoint computer 210 is shown for clarity of illustration. An endpoint computer 210 may be running a local (i.e., executed by a processor of the endpoint computer 210) proxy application 211 and a local client application 212. The local client application 212 may comprise a local application software for accessing an SaaS application software 241 hosted by the destination web server system 240. The local client application 212 may be a web browser, for example. The local client application 212 may also be a dedicated local client software for accessing the SaaS application software 241.

The SaaS scanning system 230 may comprise one or more computers for providing an SaaS scanning service to a plurality of endpoint computers 210 of different customers. More particularly, the SaaS scanning system 230 scans web traffic in-the-cloud. This advantageously allows customers to have the capability to scan web traffic without having to purchase and maintain their own scanning infrastructure. In the example of FIG. 2, the SaaS scanning system 230 hosts an SaaS scanner 231 for scanning web traffic for malicious code, denial of service (DoS) attack, phishing, violation of security policy, and/other web threats. The SaaS scanning system 230 may provide a scanning service similar to that provided by the Trend Micro InterScan Web Security as a Service™ scanning service, for example.

The SaaS scanning system 230 may also host an SaaS proxy server 232 for providing a proxy service. The SaaS proxy server 232 transmits and receives web traffic to and from the local proxy application 211, provides web traffic to the SaaS scanner 231 for scanning, and transmits and receives web traffic to and from the destination web server system 240 on behalf of the local client application 212. The SaaS proxy server 232 may identify the source and destination of web traffic using conventional proxy server methodologies.

The destination web server system 240 may comprise one or more computers that hosts an SaaS application 241. In the example of FIG. 2, the destination web server system 240 hosts the SaaS application 241, which may comprise the MICROSOFT OFFICE application, the EVERNOTE application, a web-browser accessible application, etc.

A user of the endpoint computer 210 may utilize the local client application 212 to access or work with the SaaS application 241 hosted by the destination web server system 240. Web traffic between the endpoint computer 210 and the destination web server system 240 is received by the SaaS scanning system 230, which scans the web traffic for web threats. The local client application 212 may be configured to direct to the local proxy application 211 data communications destined for the SaaS application 241 and to receive from the local proxy application 211 data communications from the SaaS application 241. The local proxy application 211 may generate a customer identity string or negotiate a customer identity string with the SaaS scanning system 230. The local proxy application 211 communicates with the SaaS scanning system 230 to select a communication protocol to be used for transmitting and receiving web traffic between the local proxy application 211 and the SaaS scanning system 230. The local proxy application 211 may insert the customer identity string in web traffic transmitted to the SaaS scanning system 230.

The SaaS scanning system 230 provides a subscription-based web traffic scanning service in-the-cloud. That is, customers pay the operator of the SaaS scanning system 230 a fee to subscribe to the scanning service. The customers and the operator are different entities, and the SaaS scanning service may be provided to many different customers. The SaaS scanning system 230 thus needs to perform some form of authentication to ensure that the web traffic to be scanned is from a local client application 212 that is being utilized by a subscribing customer, e.g., an individual or a member/employee of an organization that subscribes to the SaaS scanning service.

The customer identity string identifies a customer that subscribes to the SaaS scanning service provided by the SaaS scanning system 230. The local proxy application 211 may generate the customer identity string or negotiate the customer identity string with the SaaS scanning system 230 periodically. The customer identity string may comprise a globally-unique identifier (GUID) or other credential that can represent the unique ID of the current user of the local client application 212. For example, the local proxy application 211 may add the customer identity string to each of the local client's 212 HTTP(S) connection's header when forwarding the local client's 212 web traffic to the SaaS scanning system 230. As a particular example, for HTTPS traffic, the local proxy application 211 may add the customer identity string as a header of the CONNECT request, instead of in the payload. This allows the SaaS scanning system 230 to authenticate the HTTPS connection without having to perform decryption.

The local proxy application 211 may obtain the customer identity string by locally generating the customer identity string or by negotiating with the SaaS scanning system 230. For example, the SaaS scanning system 230 may provide a customer identity string to the local proxy application 211 after a registration process. The customer identity string may comprise alphanumeric characters, for example. The SaaS scanning system 230 may extract the customer identity string from a web traffic and map the customer identity string to a listing of valid user identifiers for authentication.

The SaaS proxy server 232 may provide a captive portal (e.g., a logon page) to allow a current user of the endpoint computer 210 to input a username and/or password. When the user is authenticated as an authorized user, the SaaS proxy server 232 may allow the user's web traffic to be forwarded to the destination web server 240. When the destination web server 240 returns web content back through the SaaS proxy server 232, the SaaS proxy server 232 may identify the web content as being for the user, and may generate a GUID for the user. The SaaS proxy server 232 writes the GUID into the HTTP header of the response and passes the response back to local proxy application 211. The local proxy application 211 may locally record the GUID of the user in the endpoint computer 210 for future usage as a customer identity string. The SaaS proxy server 232 may also write the GUID into its user database for future queries to authenticate subsequent HTTP requests that come along with the GUID.

The SaaS scanning system 230 may also synchronize its user database with all valid user identities from a customer's identity management system (e.g., MICROSOFT ACTIVE DIRECTORY). When the local proxy application 211 launches, the local proxy application 211 may read the current user's identity from a local operating system (e.g., MICROSOFT WINDOWS) and generate a GUID based on that identity (e.g., by encrypting the user identity). The GUID may be employed as a customer identity string and inserted into an HTTP header that is passed to the SaaS proxy server 232. The SaaS proxy server 232 can decrypt the GUID to extract the user identity and compare it with its user database to authenticate the user.

In an example operation, the local client application 212 transmits web traffic to the SaaS application 241 (see arrow 201). The local client application 221 transmits the web traffic using a communication protocol that is understood and expected by the SaaS application 241. Such a communication protocol is also referred to herein as a "native protocol" to distinguish it from the communication protocol employed in web traffic between the local proxy application 211 and the SaaS scanning system 230, which may be the same as or different from the native protocol. In the example of FIG. 2, the native protocol is the Hypertext Transfer Protocol (HTTP) or HTTP Secure (HTTPS).

The local proxy application 211 obtains a customer identity string for scanning the web traffic of the local client application 212. The local proxy application 211 may locally generate the customer identity string. The local proxy application 211 may also negotiate with the SaaS scanning system 230 to receive or agree on the customer identity string and to select a communication protocol to be employed in transmitting and receiving web traffic between the local proxy application 211 and the SaaS scanning system 230 (see arrow 202). The local proxy application 211 may select to use the native protocol to transmit and receive web traffic between the local proxy application 211 and the SaaS scanning system 230. The local proxy application 211 may also select to use a communication protocol that is different from the native protocol to transmit and receive web traffic between the local proxy application 211 and the SaaS scanning system 230.

As an example, when the native protocol is HTTP, the local proxy application 211 may negotiate to use HTTPS (or some encrypted or secured protocol) with the SaaS scanning system 230. This advantageously allows the local proxy application 211 to provide a layer of security to web traffic when the endpoint computer 210 is a laptop or other mobile computing device employed outside the customer network 220 (e.g., in a public hotspot). As another example, when the native protocol is HTTP, the local proxy application 211 may negotiate with the SaaS scanning system 230 to use the SPDY protocol. The SPDY protocol supports decryption and compression of the web traffic, providing improved security and reduced bandwidth, benefits that are particularly significant when the endpoint computer 210 is a mobile computing device. In general, the local proxy application 211 may select HTTP, HTTPS, SPDY (speedy), or other communication protocol for transmitting and receiving web traffic. The communication protocol selected for transmitting and receiving web traffic between the local proxy application 211 and the SaaS scanning system 230 is also referred to herein as the "selected protocol."

The local proxy application 211 receives the web traffic from the local client application 212, inserts the customer identity string in the web traffic, and transmits the web traffic with the inserted customer identity string to the SaaS scanning system 230 using the selected protocol (see arrow 203). In one embodiment, the local proxy application 211 includes the customer identity string into a header of the web traffic instead of as a payload. This allows the payload to be encrypted, such as in the case of HTTPS, while allowing the customer identity string to remain in clear text. This advantageously allows the SaaS scanning system 230 to authenticate the customer identity string without having to decrypt the payload. Having the local proxy application 211 obtain the customer identity string and insert the customer identity string in the web traffic allows for customer authentication without having to use a cookie. This advantageously allows the SaaS scanning system 230 to be employed with non-browser local clients, SaaS applications that do not save or return cookies, and HTTPS web traffic with encrypted cookies.

As a particular example, the local proxy application 211 may insert the customer identity string into a header of an HTTP CONNECT request. For both an HTTP request and an HTTPS CONNECT request, the local proxy application 211 may insert a customized HTTP header "X-TM-User". The value of the customized HTTP header may be an encrypted message that includes a company ID, a user ID, and header generation time stamp. The header value may be encrypted using a symmetric encryption algorithm, with the local proxy application 211 and the SaaS scanning system 230 sharing the same encryption key. The time stamp may be used to verify the header to avoid a replay attack. A particular example of a customized HTTP header with encrypted header value is shown below.

X-TM-User:
56a321903bf9a64822a1bb5c96825fcd8e133b4d07d53-
36b15c39eacaad1405864
bf7283e124ca0e10d5c2104ba4277f The above customized HTTP Header (i.e., X-TM User) may have a value of "044b1799-d7dd-4f18-b886-488d7bfc7bdb, terry@trendmicro.com, 1423633741" in plaintext, for example.

The SaaS scanning system 230 receives the web traffic, extracts the customer identity string from the web traffic, and authenticates the customer identity string. The SaaS scanning system 230 may authenticate the customer identity string a variety of ways without detracting from the merits of the present invention, such as by database look up, processing the customer identity string using a predetermined algorithm, and so forth. Once authenticated, the SaaS scanning system 230 scans the web traffic for web threats. For example, the SaaS proxy server 232 may receive the web traffic from the local proxy application 211 and provide the web traffic to the SaaS scanner 231 for scanning for web threats (see arrow 204). A predetermined remedial action, such as quarantine, blocking, cleaning, etc., may be performed when a web threat is detected in the web traffic. Assuming that the web traffic is free of web threats, the SaaS scanning system 230 transmits the web traffic to the destination web server system 240 using the native protocol (see arrow 205). For example, the SaaS proxy server 232, which serves as a proxy for the local client application 212, may forward the web traffic to the SaaS application 241. Accordingly, the SaaS application 241 functions as if it is interacting with the local client application 212. Responsive to the web traffic, the SaaS application 241 transmits web traffic to the local client application 212 by way of the SaaS proxy server 232 using the native protocol. The web traffic from the SaaS application 241 may be scanned by the SaaS scanning system 230 and received by the local client application 212 in the reverse direction.

Figure 3:
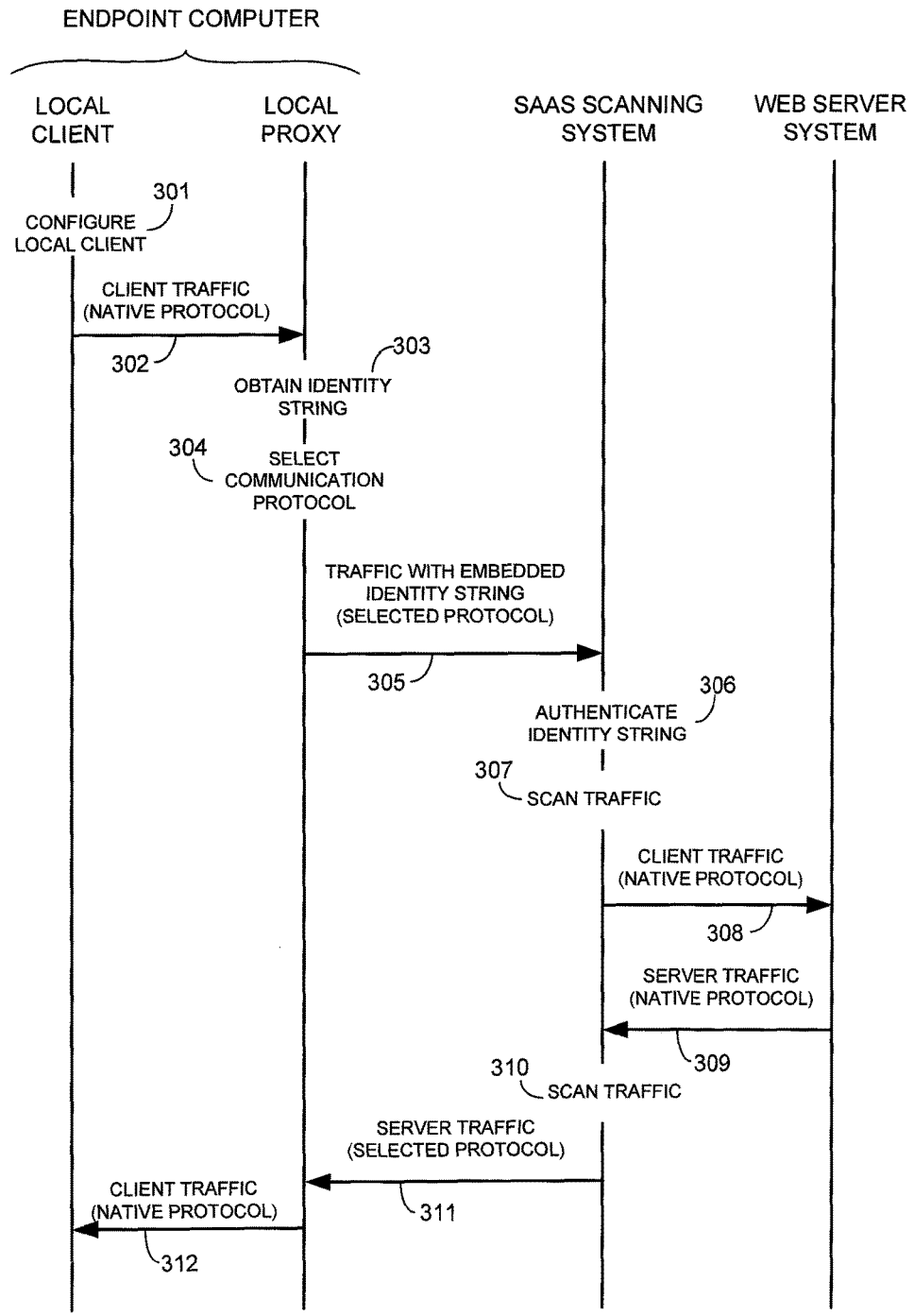
FIG. 3 shows a call diagram of a computer-implemented method of scanning web traffic in accordance with an embodiment of the present invention.

FIG. 3 shows a call diagram of a computer-implemented method of scanning web traffic in accordance with an embodiment of the present invention. The method of FIG. 3 is explained using the components of the SaaS system 200 of FIG. 2 for illustration purposes only. Other components may also be employed without detracting from the merits of the present invention.

In the example of FIG. 3, a local client (e.g., local client application 212) and a local proxy (e.g., local proxy application 211) are running locally on the endpoint computer (e.g., endpoint computer 210). The local client is configured to use the local proxy to communicate with an SaaS application (e.g., SaaS application 241) hosted in-the-cloud by a web server system (e.g., destination web server system 240) (step 301). For example, the local proxy may be installed in the operating system of the local client. The operating system's proxy setting or the local client's proxy setting (e.g., browser proxy setting) may be configured (or enforced to be configured by the local proxy) to direct web traffic to the local proxy. This allows web traffic from the local client to be forwarded to the local proxy.

Web traffic transmitted by the local client to the SaaS application hosted by the web server system is directed to and received by the local proxy (step 302). The web traffic between the local client and the local proxy is transmitted using a native protocol (e.g., HTTP or HTTPS) understood and expected by both the local client and the SaaS application. The local proxy obtains a customer identity string of the customer, who may be the user or owner of the endpoint computer (step 303). The local proxy may locally generate the customer identity string, receive the customer identity string from the SaaS scanning system, retrieve the customer identity string from a local or remote database, negotiate the customer identity string with the SaaS scanning system, receive the customer identity string from the local client, or obtain the customer identity string some other way.

The local proxy may select a communication protocol to be used in transmitting and receiving web traffic between the local proxy and the SaaS scanning system (step 304). The communication protocol to be selected may be user-configurable (e.g., by way of a settings interface, configuration file) or negotiated with the SaaS scanning system, for example. The selected communication protocol may be the same as or different from the native protocol.

The local proxy inserts the customer identity string in web traffic transmitted to the SaaS scanning system (step 305). The local proxy transmits the web traffic to the SaaS scanning system using the selected communication protocol (step 305). The SaaS scanning system extracts the customer identity string from the web traffic and authenticates the customer identity string (step 306). The SaaS scanning system scans the web traffic for web threats when the customer identity string is valid and identifies an authorized, subscribing customer (step 307).

The SaaS scanning system may perform a predetermined remedial action in response to finding a web threat in the web traffic. Otherwise, the SaaS scanning system forwards the web traffic to the web server system using the native protocol (step 308). Using the native protocol in web traffic between the local client and the local proxy and in web traffic between the SaaS scanning system and the web server system advantageously allows the scanning process to be transparent to the local client and the SaaS application.

The SaaS application hosted by the web server system processes the web traffic transmitted by the local client. The SaaS application may then transmit web traffic back to the local client using the native protocol (step 309). The SaaS scanning system receives the web traffic from the web of server system and scans the web traffic for web threats (step 310). When the web traffic from the SaaS scanning system is free of web threats, the SaaS scanning system forwards the web traffic to the local proxy using the selected protocol (step 311). The local proxy thereafter forwards the web traffic to the local client using the native protocol (step 312).

Systems and methods for SaaS scanning of web traffic have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method for scanning web traffic, the method comprising:
   receiving, by a local proxy, a first web traffic transmitted by a local client, wherein the local proxy and the local client are separate applications running on a same endpoint computer;
   the local proxy obtaining a customer identity string that identifies a user of the local client as a paying customer to a software as a service (SaaS) scanning service;
   the local proxy including the customer identity string in a header of the first web traffic, encrypting the header using a same symmetric encryption key shared by both the local proxy and an SaaS scanning system that provides the SaaS scanning service, and thereafter transmitting the first web traffic to the SaaS scanning system;
   the SaaS scanning system decrypting the header using the same symmetric encryption key and authenticating the customer identity string included in the first web traffic to verify that the user of the local client is subscribed to the SaaS scanning service; and
   the SaaS scanning system scanning the first web traffic for web threats,
   wherein the first web traffic is transmitted by the local client to the local proxy using a first communication protocol that is different from a second communication protocol employed by the local proxy to transmit the first web traffic to the SaaS scanning system.

2. The computer-implemented method of claim 1, wherein the first communication protocol is HTTP and the second communication protocol is HTTP Secure (HTTPS).

3. The computer-implemented method of claim 1, wherein the SaaS scanning system scans the first web traffic for malicious code.

4. The computer-implemented method of claim 1, further comprising:
   after scanning the first web traffic for web threats, the SaaS scanning system transmitting the first web traffic to a web server system that is in communication with the local client.

5. The computer-implemented method of claim 1, further comprising:
   after scanning the first web traffic for web threats, the SaaS scanning system transmitting the first web traffic using the first communication protocol to a web server system that hosts an SaaS application in communication with the local client.

6. The computer-implemented method of claim 5, further comprising:
   receiving, by the SaaS scanning system, a second web traffic transmitted by the SaaS application using the first communication protocol; and
   the SaaS scanning system scanning the second web traffic for web threats.

7. The computer-implemented method of claim 6, further comprising:
   the SaaS scanning system transmitting the second web traffic to the endpoint computer.

8. The computer-implemented method of claim 1, wherein the local proxy receives the first web traffic from a web browser.

9. A non-transitory computer-readable medium with instructions stored thereon, that when executed on a processor of an endpoint computer, perform the steps of:
   receiving, by a local proxy, web traffic transmitted by a local client, wherein the local proxy and the local client are separate applications on the endpoint computer;
   obtaining a customer identity string that identifies a user of the local client as a paying customer of a software as a service (SaaS) scanning service; and
   including the customer identity string in a header of the web traffic, encrypting the header using a same symmetric encryption key shared by the local proxy and an SaaS scanning system, and thereafter transmitting the web traffic to the SaaS scanning system that provides the SaaS scanning service to scan the web traffic for web threats,
   wherein the web traffic is received from the local client using a first communication protocol and the web traffic is transmitted to the SaaS scanning system using a second communication protocol that is different from the first communication protocol.

10. The non-transitory computer-readable medium of claim 9, wherein the local client is a web browser.

11. The non-transitory computer-readable medium of claim 9, wherein the customer identity string is obtained by locally generating the customer identity string in the endpoint computer.

12. A system for scanning web traffic, the system comprising:
   an endpoint computer running a local client and a local proxy that receives web traffic from the local client, obtains a customer identity string that identifies a user of the local client as a paying customer of a software as a service (SaaS) scanning service, includes the customer identity string in a header of the web traffic, encrypts the header using a same symmetric encryption key shared by the local proxy and an SaaS scanning system that provides the SaaS scanning service, and transmits the web traffic to the SaaS scanning system, wherein the local client and the local proxy are separate applications running on the endpoint computer;
   the SaaS scanning system that receives the web traffic, decrypts the header using the same symmetric encryption key, extracts the customer identity string from the web traffic, authenticates the customer identity string, scans the web traffic for web threats, and transmits the web traffic to a web server system; and
   the web server system that receives the web traffic from the SaaS scanning system after the SaaS scanning system scans the web traffic for the web threats,
   wherein the local client transmits the web traffic to the local proxy using a first communication protocol and the local proxy transmits the web traffic to the SaaS scanning system using a second communication protocol that is different from the first communication protocol.

13. The system of claim 12, wherein the web server system hosts an SaaS application in communication with the local client.

14. The system of claim 12, wherein the local client is a web browser.

15. The system of claim 12, wherein the local client transmits the web traffic to the local proxy using hypertext transfer protocol (HTTP) and the local proxy transmits the web traffic to the SaaS scanning system using HTTP Secure (HTTPS).

\* \* \* \* \*